United States Patent [19]

Sackmann et al.

[11] 4,048,422

[45] Sept. 13, 1977

[54] PRODUCTION OF COPOLYMER POWDERS FROM MALEIC ANHYDRIDE AND 1-OLEFINS

[75] Inventors: Günter Sackmann, Opladen; Günter Kolb, Leverkusen; Friedhelm Müller, Odenthal, Bergisch-Gladbach, all of Germany

[73] Assignee: Bayer Aktiengesellschaft, Germany

[21] Appl. No.: 647,502

[22] Filed: Jan. 8, 1976

[30] Foreign Application Priority Data

Jan. 14, 1975 Germany .............................. 2501123

[51] Int. Cl.² .......................... C08F 1/09; C08F 15/02
[52] U.S. Cl. ................................... 526/203; 260/887; 428/537; 526/272
[58] Field of Search ............... 526/203, 207, 202, 201, 526/272

[56] References Cited

U.S. PATENT DOCUMENTS

| | | | |
|---|---|---|---|
| 2,921,928 | 1/1960 | Fields | 526/272 X |
| 2,979,487 | 4/1961 | Martin, Jr. | 526/203 X |
| 3,553,183 | 1/1971 | Fields | 526/272 X |
| 3,729,451 | 4/1973 | Blecke | 526/272 X |

*Primary Examiner*—Christopher A. Henderson, Jr.
*Attorney, Agent, or Firm*—Connolly and Hutz

[57] ABSTRACT

An improved process for the production of powders of maleic acid anhydride/1-olefin copolymers by suspension polymerization in the presence of special dispersion agents which are obtained by the reaction of a copolymer of maleic acid anhydride and a 1-olefin with an aliphatic monohydric alcohol or an aliphatic monoamine or a mixture thereof, at least 30 mol % of the anhydride groups being esterified to semi-esters or amidated to semi-amides. The copolymer powders obtained have a surprisingly narrow particle size distribution and can be used without grinding or sifting as reactive fillers for natural and synthetic rubbers. They also can be used for the production of paper coating agents as they dissolve easily and without residue in alkalis, ammonia or amines.

6 Claims, No Drawings

PRODUCTION OF COPOLYMER POWDERS FROM MALEIC ANHYDRIDE AND 1-OLEFINS

The present invention relates to an improved process for the production of maleic acid anhydride/1-olefin-copolymers by suspension polymerisation in the presence of special dispersion agents.

A method is known for U.S. Pat. No. 2,378,629 for the production of copolymers from maleic acid anhydride and linear or branched aliphatic 1-olefins, present in excess where necessary, by means of radical copolymerisation using various methods, e.g. polymerisation is solution or bulk polymerisation. The isolation of the copolymers obtained by this method in the form of a solid fine powder is, however, still associated with great technical problems. Thus, for example, in the case of polymerisation in solvents, the copolymers must be isolated by distilling off the solvent or by dissolving and reprecipitating with subsequent filtration and drying. With bulk polymerisation the products usually occur as cohesive and unworkable tough pastes which have to be subjected to an additional granulation, grinding and sifting process in order to be converted into powder.

In addition, the production of copolymers of maleic acid anhydride and 1-olefins by precipitation polymerisation in the presence of peroxide catalysts is known for U.S. Pat. No. 2,430,313 which describes a process in which the comonomers are initially dissolved in an inert solvent from which the copolymers are precipitated. Conglomerated pastes rather than powder-form copolymers are obtained in this process and these must undergo a grinding and sifting process if they are to be obtained in the form of a powder.

Finally, the polymerisation of maleic acid anhydride and excess liquid 1-olefins having 4 to 14 C-atoms in the presence of a special dispersion agent and a radical former is known from U.S. Pat. No. 3,729,451. This process produces powder which can be easily isolated by filtration. The 1-olefins used in excess act as a dispersion medium. Column 2, line 33 to column 4, line 20 of this document indicates that maleic acid anhydride/$C_{14}$ to $C_{18}$-1-olefin copolymers of equimolecular structure must be used as dispersion agent. A disadvantage of this process is the necessity to produce the dispersion agent and to start from maleic acid copolymers other than those to be produced and this involves a further polymerisation process. Another substantial disadvantage is that the dispersion agents used provide polymer powder having a large particle size distribution within a range of from about 20 to 500 $\mu$. The powders of this process are not in the form of discrete spheres but are irregularly formed particles which are partially agglomerated and are thus more difficult to filter than the powders of the present invention. In order that they may be used as fillers having uniform particle size they must be ground and sifted.

The object of the present invention is to produce maleic acid anhydride/1-olefin copolymers in powder form consisting of discrete spheres, possessing a very narrow particle size distribution of from about 10 to 30 $\mu$ and which are suitable, without the need for any further grinding and sifting process, for use as reactive fillers for natural and synthetic elastomers.

The object was achieved by polymerising maleic acid anhydride with more than the equimolecular quantity of a 1-olefin having 2 to 8 C-atoms in an organic dispersion medium in the presence of a radical former and in the presence of a special dispersion agent soluble in the dispersion medium, under the conditions of a suspension polymerisation, in which the special dispersion agent is a reaction product of a copolymer of maleic acid anhydride and 1-olefins having 2 to 8 C-atoms with at least one primary, aliphatic, saturated or mono-olefinically unsaturated, linear or branched monohydric alcohol having 8 to 22 C-atoms or with at least one primary or secondary aliphatic, saturated, linear or branched monoamine having 8 to 22 C-atoms or mixtures thereof.

The present invention relates to a process for the production of a copolymer which comprises reacting maleic acid anhydride and an excess of at least one 1-olefin having from 2 to 8 carbon atoms at a temperature of from 30° C to 200° C and a pressure of from 1 to 200 atm in an organic dispersion medium comprising 1-olefin or 1-olefin and a solvent which is inert with respect to the monomers and which dissolves the 1-olefin but not maleic acid anhydride, the reaction taking place in the presence of a radical former and from 0.5 to 10% by weight based on the maleic acid anhydride of a dispersion agent soluble in the dispersion medium which is obtained by the reaction of:

I. 1 mol of a copolymer of maleic acid anhydride and a 1-olefin having from 2 to 8 carbon atoms, with II. from 1 to 10 mol of an aliphatic, saturated or monoolefinically unsaturated, linear or branched, monohydric alcohol having from 8 to 22 carbon atoms, or from 1 to 10 mol of an aliphatic, saturated, linear or branched monoamine having from 8 to 22 carbon atoms or from 1 to 10 mol of a mixture of the monohydric alcohol and monoamine, at least 30 mol% of the anhydride groups being esterified to semi-esters or amidated to semi-amides.

The process according to the invention produces easily filterable copolymer powders, which surprisingly consist of substantially discrete spheres having a particle diameter of about 10$\mu$ to 30$\mu$, and which because of their narrow particle size distribution can be used, without the need for grinding or sifting, as an extraordinarily easy and quick dissolving residue-free powder in alkalis, ammonia or amines for the production of paper coating agents or used directly as a reactive filler, optionally after mixing with other powder fillers, for natural and synthetic elastomers. In view of the fact that the dispersion agents in U.S. Pat. No. 3,729,451 consisting of equimolecular copolymers of maleic acid anhydride and 1-olefins only display a good dispersion effect when the 1-olefins have 14 to 18 C-atoms, the dispersion effect of the dispersion agents used according to the invention is particularly suprising, since they consist of copolymers of maleic acid anhydride and $C_2$ to $C_8$-1-olefins, which only need to be partially esterified or amidated. It is also surprising that by means of the dispersion agents used according to the invention, copolymers are obtained consisting of discrete spheres and having a narrow particle size distribution, whereas according to U.S. Pat. No. 3,729,451 irregularly formed, partially agglomerated particles having a substantially broader particle size distribution are obtained. It is also of great advantage in performing the process of the invention that it is possible to use dispersion agents which are formed from the same constituents as the copolymer powders to be produced. The latter merely need to undergo an esterification or amidation process.

Maleic acidhydride and 1-olefins having 2 to 8 C-atoms are used to produce the substantially alternating and equimolecular structure copolymer powders of the invention. The following should be mentioned as 1-olefins: ethylene, propylene, butylene, isobutylene, hexene-1, diisobutylene (×2,4,4-trimethylpentene-1) and styrene or any mixtures thereof. Isobutylene and diisobutylene, particularly diisobutylene; are preferred.

More than 1 mol, preferably up to 10 mols, in particular 2 to 5 mols of 1-olefin are added to 1 mol of maleic acid anhydride. The 1-olefin used in excess acts as a dispersion medium.

The production of maleic acid anhydride/1-olefin copolymer powder takes place under the known conditions of suspension polymerisation. (cf U.S. pat. No. 3,729,451).

For use as a radical former the usual organic initiators such as peroxides, hydroperoxides, peresters, azo-compounds and redox catylst system can be considered. Examples are the following: acyl peroxides, for example: dibenzoyl peroxide, p-chlorobenzoyl peroxide, 2,4-dichlorobenzoyl peroxide, lauroyl peroxide, succinyl peroxide, di-tert.-butyl peroxide, dicumyl peroxide, alkyl hydro peroxides, such as tert. butyl hydroperoxide, umylhydro peroxide, p-menthane hydroperoxide, isophthalic monoperacid, percarbonates such as cyclohexylperoxydicarbonate, diisopropylperoxydicarbonate, ethylhexyl-peroxydicarbonate, and tert.-butyl peracetate, tert.-butyl perbenzoate, tert.-butyl perisononate, mono-tert.-butyl permaleinate, tert.-butyl peroctoate, tert.-butylperpivalate, azodiisobutyric acid dinitrile, azo-dicarbonamide, azodicarboxylic acid ester or acetylcyclohexanesulphonyl peroxide. The organic per compounds can also be used in known manner in combination with reducing agents. Suitable reducing agents are for example:ascorbic acid, aromatic amines, such as p-toluidine. In connection with initiators and redox systems mention should be made of Houben-Weyl, Methoden der Organischen Chemie. 1961, vol. XIV/1.

The amount of catalyst which maybe used lies within the usual limits, i.e. approximately from 0.01 to 5% by weight, preferably from 0.01 to 2% by weight based on the maleic acid anhydride used.

The polymerisation process may be carried out continuously or discontinuously at temperatures of from 30° C to 200° C, preferably 60° C – 120° C and at pressures of from 1 to 200 atm., preferably 1 to 50 atm.

If the 1-olefin to be polymerised is liquid, as in the case of hexene-1, diisobutylene or styrene, the excess 1-olefin itself can serve as the dispersion medium. However, the excess 1-olefin can also be used mixed with an inert solvent in quantites of 10 to 80% by volume, preferably 20 to 50% by volume, based on the volume of inert solvent and 1-olefin. In the copolymerisation of excess 1-olefins having 2 to 4 C-atoms, an additional inert solvent should preferably be used.

Inert solvents are understood to include solvents which do not react with the monomers and which do not dissolve the maleic acid anhydride or the copolymers or dissolve them to not more than 1 – 2% at 25° C. The following are examples: linear or branched aliphatic or cycloaliphatic hydrocarbons having boiling points in the range of from 50° to 200° C, such as ligroine, petroleum ether, benzines and cyclohexane.

The dispersion agents used according to the invention are derived from copolymers of maleic acid anhydride with 1-olefins having 2 to 8 C-atoms having a substantially alternating and equimolecular structure. Olefins of this type are ethylene, propylene, butylene, isobutylene, hexane, diisobutylene, styrene or any mixture thereof, preferably isobutylene and diisobutylene, particularly diisobutylene. The copolymers may have been produced according to known processes or the present one. The copolymers are reacted with the following primary alcohols or primary and secondary amines or their mixtures optionally in solvents such as dioxane, tetrahydrofurane, dimethylformamide, dimethylsulphoxide, tetramethylenesulphone, toluene, xylene or chlorobenzene, at temperatures of from 50° C to 200° C to form the appropriate maleic acid semiesters or maleic acid semi-amides. The reaction may be complete. However, it is sufficient to have a degree of esterification or amidation of at least 30%, preferably 50 to 85%, i.e. at least 30% or 50 to 85% of the anhydride groups of the copolymerised maleic acid anhydride are converted into maleic acid semi-esters and/or semi-amides. If longer chained alcohols or amides are used, the degree of esterification or amidation is generally lower, and it is higher if short chained alcohols or amines are used, and it is always in the range of from 30 to 100%. The esterification or amidation should preferably always be continued until the products formed are soluble in benzine. Conversion of the anhydride groups into diesters or diamides is undesirable. If 1 mol of the maleic acid anhydride/1-olefin-copolymer is reacted with more than 1 mol of alcohol or amine, esterification or amidation is discontinued after the formation of the semi-esters or semi-amides, or after a degree of esterification or amidation of at least 30%. It is also possible to produce the dispersion agents used according to the invention directly by copolymerisation of the maleic acid semi-esters or maleic acid semi-amides with the corresponding 1-olefins such as ethylene, propylene, 1-hexene, diisobutylene or styrene by known methods. In this case, maleic acid anhydride is first reacted with the alcohols and/or amines specified below to form the corresponding semi-esters and/semi-amides.

The alcohols preferably used for the production of the dispersion agents are primary, aliphatic, saturated or monoolefinically unsaturated, linear or branched, monovalent alcohols having 8 to 22 C-atoms, preferably having 10 to 18 C-atoms, particularly having 12 C-atoms, such as octanol-(1), nonanol-(1), 3,5,5-trimethylhexanol-(1), decanol-(1), dodecanol-(1), tetradecanol-(1), hexadecanol-(1), octadecanol-(1), oleylalcohol, mixtures thereof or technical mixtures of the above mentioned alcohols. Dodecanol-(1) is particularly preferred as are also technical mixtures such as $C_{12}$-lorols.

Amines used are primary or secondary, aliphatic, saturated, linear or branched monoamines having 8 to 22 C-atoms, preferably having 10 to 18 C-atoms. Examples are: octylamine, dodecylamine, tetradecylamine, hexadecylamine, stearylamine and N-methylstearylamine.

Mixtures of monoamines and alcohols may also be used.

Preferred dispersion agents are those having semi-ester groups.

The dispersion agents are used in quantities of 1 to 10% by weight based on maleic acid anhydride, and preferably in quantities of 1 to 5% by weight.

It is a great advantage of the suspension copolymerisation process according to the invention, that it is always possible to use those suspension auxiliary agents for the copolymerisation of maleic acid anhydride and the 1-olefins which are derived from the copolymers to be produced and this results in a considerable simplification in performing the copolymerisation compared to known suspension processes.

Particularly preferred is the copolymerisation of maleic acid anhydride (1 mol) and excess diisobutylene (2 to 5 mols) without a further dispersion medium but with the aid of a dispersion agent having an alternating end equimolecular structure and which is a copolymer of maleic acid anhydride and diisobutylene, which has been reacted with dodecanol-(1) or a $C_{12}$-lorol mixture to form at least 30% semi-ester.

The fluid maleic acid anhydride/1-olefin-copolymer powders obtained by the process according to the invention are extraordinarily easy to filter and consist of substantially discrete spheres having a particle diameter of about 10 to 30μ. They are residue free and they dissolve quickly and easily in aqueous alkalis, ammonia or amines. On the other hand, on account of their narrow particle size distribution they lend themselves to be used as reactive fillers for elastomers possible in admixture with other powders, without the need for any further grinding or sifting stage.

The copolymers have substantially alternating and equimolecular structure and have a degree of polymerisation between 20 to 1000, preferably from 50 to 300, corresponding to molecular weights from about 4000 to 200,000 preferably 10,000 to 60,000 determined by membraneosmometry. The preferred copolymers have intrinsic viscosities of 0.05 to 0.70 dl/g, measured in dimethylformamide (DMF) at 25° C.

The fluid copolymer powders obtained according to the invention may be used in the form of their alkali, ammonium or amine salts as dispersion agents for pigments or as a coating for leather, paper, wood and metals or for the production of dispersible latices. They may be converted by reaction with alcohols into polymers having a semi-ester structure, which in the form of their alkali, ammonium or amine salts are particularly suitable as paper coating agents. In particular, they may be used as reactive fillers for natural and synthetic elastomers.

Natural and synthetic elastomers include for example, natural rubber, polyisoprene, polybutadiene, copolymers of butadiene with styrene or acrylonitrile, poly-2-chlorobutadiene, ethylene-propylene-diene-polymerisates and polyurethanes.

The parts and percentages given in the examples are by weight, unless otherwise stated. The intrinsic viscosities [η] (dl/g) were measured in dimethylformamide at 25° C.

PRODUCTION OF DISPERSION AGENTS

A solution is made of 1 mol maleic acid anhydride, 1.1 mol diisobutylene (or isobutylene or styrene) and 400 ml toluene. 2 g azodiisobutyricacid dinitrile, dissolved in 20 ml toluene, are then added to the solution and the mixture is polymerised for 24 hours at 70° C. After the removal of the solvent, 1 mol of each of the copolymers given in table I are reacted with 2 mol of the alcohol or amine given in table I for 24 hours at 120° C for 150° C to form dispersion agents A to V. The dispersion agents are dissolved in the olefins to be copolymerised with maleic acid anhydride or in the dispersion medium to form 20% solutions and are used in examples 1 to 33.

EXAMPLES 1 to 19

Suspension copolymerisation of maleic acid anhydride and diisobutylene.

The following reaction mixture is prepared under a nitrogen atmosphere in a 100-l steel autoclave fitted with a fast running stirrer.

12.25 kg maleic acid
39.00 kg diisobutylene
4.35 kg dispersion agent solution (20% in diisobutylene) of dispersion agents A to V (see table I).

While being stirred (120 rpm) the mixture is heated to 75° C. Into this mixture is fed, by means of a feed pump, 25% by volume of an initiator solution of 0.325 kg t-butyl peroctoate, dissolved in 2.500 kg diisobutylene, over a period of 2 hours.

The temperature is then raised to 90° C within 1 hour. The remainder of the initiator solution is then added over a period of 1 hour and the polymerisation temperature is maintained at 90° C. After the addition is completed, the mixture is stirred for a further 6 hours at 90° C. The resulting fine particle suspension is discharged and centrifuged, and the powder obtained is dried in a vacuum cabinet for 24 hours at 70° C.

Table II is a compilation of the results of the copolymerisation of maleic acid anhydride and diisobutylene conducted with various dispersion agents. In all the examples the polymerisation temperature was 70°–90° C and the polymerisation time was 5 hours.

Table I

| Dispersion agent | Starting polymer | [η] (dl/g) | Alcohol (amine) | Reaction temp. | Reaction time | Degree of esterification (amidation) |
|---|---|---|---|---|---|---|
| A | MAH/DJB | 0.22 | 3,5,5-Trimethyl-hexanol-(1) | 120° C | 24 hr | 75% |
| B | " | " | Decanol-(1) | 120° C | 24 hr | 70% |
| C | " | " | Dodecanol-(1) | 120° C | 24 hr | 58% |
| D | " | " | Tetradecanol-(1) | 150° C | 24 hr | 50% |
| E | " | " | Hexadecanol-(1) | 150° C | 24 hr | 46% |
| F | " | " | Oleicalcohol-(1) | 150° C | 24 hr | 38% |
| G | " | " | Octadecanol-(1) | 150° C | 24 hr | 36% |
| H | MAH/JB | 0.38 | Tetradecanol-(1) | 150° C | 24 hr | 57% |
| J | " | " | Hexadecanol-(1) | 150° C | 24 hr | 50% |
| K | " | " | Oleicalcohol-(1) | 150° C | 24 hr | 45% |
| L | " | " | Octadecanol-(1) | 150° C | 24 hr | 43% |
| M | MAH/Styrene | 0.36 | Decanol- | 150° C | 24 hr | 80% |

Table I-continued

| Dispersion agent | Starting polymer | [η] (dl/g) | Alcohol (amine) | Reaction temp. | Reaction time | Degree of esterification (amidation) |
|---|---|---|---|---|---|---|
| N | " | " | Dodecanol-(1) | 150° C | 24 hr | 69% |
| O | " | " | Tetradecanol-(1) | 150° C | 24 hr | 60% |
| P | " | " | Hexadecanol-(1) | 150° C | 24 hr | 54% |
| R | " | " | Octadecanol-(1) | 150° C | 24 hr | 42% |
| S | MAH/DJB | 0.22 | Stearyl-Amine(1) | 150° C | 24 hr | 60% |
| T | " | " | N-Methyl-stearyl-amine(1) | 150° C | 24 hr | 56% |
| U | MAH/Styrene | 0.36 | Stearyl-amine(1) | 150° C | 24 hr | 44% |
| V | " | " | N-Methyl-stearyl-amine(1) | 150° C | 24 hr | 40% |

Table II

| Example | Dispersion agent | Yield of Copolymer powder (based on MAH) | Powder particle size (μ) | [η] of the copolymer measured in DMF at t = 25° |
|---|---|---|---|---|
| 1 | A | 72.9% | 15 – 30 | 0.216 (dl)/g |
| 2 | B | 92.5% | 10 – 25 | 0.213 " |
| 3 | C | 95.9% | 10 – 30 | 0.221 " |
| 4 | D | 95.3% | 12 – 28 | 0.194 " |
| 5 | E | 97.6% | 10 – 29 | 0.216 " |
| 6 | F | 97.0% | 15 – 30 | 0.348 " |
| 7 | G | 91.5% | 12 – 25 | 0.207 " |
| 8 | H | 98.5% | 10 – 30 | 0.248 " |
| 9 | J | 100% | 18 – 30 | 0.242 " |
| 10 | L | 100% | 15 – 30 | 0.240 " |
| 11 | M | 92.8% | 10 – 25 | 0.260 " |
| 12 | N | 92.8% | 10 – 28 | 0.250 " |
| 13 | O | 94.7% | 15 – 29 | 0.230 " |
| 14 | P | 98.5% | 10 – 25 | 0.220 " |
| 15 | R | 95.2% | 15 – 30 | 0.260 " |
| 16 | S | 96.6% | 10 – 30 | 0.226 " |
| 17 | T | 90.5% | 12 – 30 | 0.152 " |
| 18 | U | 94.3% | 12 – 26 | 0.238 " |
| 19 | V | 100% | 18 – 30 | 0.152 " |

TABLE III

| Examples | Dispersion agent | Yield of Copolymer powder (based on MAH) | Powder particle size (μ) | [η] of the copolymer measured in DMF at t = 25° |
|---|---|---|---|---|
| 20 | C | 100% | 10 – 30 | 0.186 (dl)/g |
| 21 | D | 75.7% | 12 – 28 | 0.134 " |
| 22 | E | 83.8% | 11 – 30 | 0.158 " |
| 23 | F | 58.4% | 10 – 28 | 0.094 " |
| 24 | G | 74.7% | 12 – 30 | 0.066 " |
| 25 | H | 91.0% | 10 – 30 | 0.176 " |
| 26 | J | 81.8% | 10 – 25 | 0.138 " |
| 27 | K | 66.6% | 12 – 30 | 0.140 " |
| 28 | L | 71.5% | 10 – 30 | 0.133 " |
| 29 | M | 71.5% | 12 – 30 | 0.140 " |
| 30 | N | 74.1% | 12 – 28 | 0.180 " |
| 31 | O | 78.6% | 10 – 29 | 0.140 " |
| 32 | P | 78.0% | 12 – 30 | 0.150 " |
| 33 | R | 83.2% | 10 – 30 | 0.170 " |

EXAMPLES 20 – 33

Suspension copolymerisation of maleic acid anhydride and isobutylene.

The following reaction mixture is introduced into a 1-l three necked flask equipped with stirrer, reflux condenser, thermometer and gas input pipe:
 196 g maleic acid anhydride
 528 g ligroine
 25 g dispersion agent in 75 g ligroine.

The mixture is heated to 60° C and then 112 – 120 g of gaseous isobutylene are introduced during which time the dispersion agent has dissolved in the dispersion medium of isobutylene and ligroine. During the further addition of isobutylene 5.2 g tert.-butyl peroctoate, dissolved in 40 g ligroine are added dropwise for ¼ hour. The temperature of the reaction mixture is raised to 90° C within 1 hour and isobutylene is fed in until a total quantity of 260 g has been fed in. After feeding has ended, the mixture is stirred for a further 2 hours at 90° C. The fine particle suspension produced is filtered off and dried in a vacuum cabinet at 60° C. The copolymer powders obtained are non-sticking and fluid. The copolymerisation of maleic acid anhydride and isobutylene conducted with various dispersion agents are summarised in table III.

EXAMPLE 34

The following mixture is poured into a 1-l three necked flask equipped with stirrer, reflux condenser, thermometer and dropping funnel:
 98.0 g maleic acid anhydride
 264.0 g ligroine
 2.02 g dispersion agent C in 20 g ligroine.

The mixture is heated to 75° C with nitrogen passing over it and solutions I and II are simultaneously added dropwise to the stirred mixture over a period of 3 hours.

| Solution I: | 2.60 | g t-butyl peroctoate |
|---|---|---|
|  | 20.0 | g ligroine |
| Solution II: | 104.0 | g styrene |
|  | 104.0 | g ligroine |

After the dropwise addition has ended, the temperature of the reaction mixture is raised to 80° C and the mixture is stirred for a further 4 hours. The fine particle suspension produced is filtered off and dried in a vacuum cabinet at 70° C. There are obtained 200 g of a white powder having a particle size of 10 – 25 μ and a viscosity of 0.51 (dl)/g measured at 25° C in DMF.

EXAMPLE 35

The following reaction mixture is heated for 4 hours to 90° C in a 500 ml three necked flask equipped with stirrer, thermometer, reflux condenser and nitrogen input pipe.

49.0 g maleic acid anhydride
183.0 g hexane-(1)
1.66 g dispersion agent C
1.30 g t-butyl peroctoate.

The resultant fine powder polymerisate is filtered off and dried at 60° C in a vacuum cabinet.

$[\eta]$ = 0.14 (dl)/g (25° C in DMF), particle size: 10 – 30 $\mu$.

EXAMPLE 36

98.0 g maleic acid anhydride, 264 g ligroine, and 2.02 g dispersion agent C — dissolved in 20 g ligroine — and 2.60 g t-butyl peroctoate are poured into a 1 l steel autoclave. The mixture is heated to 80° C and then ethylene is forced in at a pressure of 80 bars. After 6 hours of polymerisation time the resultant fine powder suspension is filtered off and the powder is dried in a vacuum cabinet at 70° C.

$[\eta]$ = 0.26 (dl)/g (25° C in DMF), particle size 14 – 29 $\mu$.

EXAMPLE 37

49.0 g of maleic acid and 83 g dodecanol are stirred for 5 hours at 100° C in a 500 ml three necked flask. Then it is cooled to 80° C and 75 g diisobutylene and 1.86 g azodiisobutyric acid dinitrile are added and the mixture is polymerised for 24 hours at this temperature. The excess diisobutylene is then drawn off by a rotatary evaporator. 8.60 g of the residue are put in a 1-l three necked flask equpped with stirrer, thermometer, reflux condenser and nitrogen input pipe together with 122.5 g maleic acid anhydride, 420.0 g diisobutylene and 0.325 g t-butylperoctoate and heated for 4 hours to 90° C. The resultant suspension is filtered off and dried in a vacuum cabinet at 70° C.

$[\eta]$ = 0.22 (dl)/g (25° C in DMF), particle size: 18 – 28 $\mu$.

COMPARISON EXAMPLE

The suspension copolymerisation of maleic acid anhydride and diisobutylene was carried out once in a similar manner to example 3 of the present application using dispersion agent C and a second time using the dispersion agents described in U.S. Pat. No. 3,729,451 (maleic acid anhydride/1-tetradecene- and maleic acid anhydride/1 -octadecene- copolymerisate respectively).

The following table shows the results obtained.

| Dispersion agent | Invention Dispersion agent C | Dispersion agents according to US-PS 3 729 451 Copolymerisate | |
|---|---|---|---|
| | | Maleic acid anhydride/1-octadecene | Maleic acid anhydride/1-tetradecene |
| $[\eta]$ (dl)/g | 0.221 | 0.304 | 0.300 |
| particle size | 10 – 30 $\mu$ | 50 – 500 $\mu$ | 30 – 250 $\mu$ |

PRACTICAL EXAMPLE

Two rubber mixtures were produced the first containing as a filler a maleic acid anhydride/diisobutylene-copolymerisate obtained according to the process of the present invention and the second containing a copolymerisate of maleic acid anhydride and diisobutylene obtained according to the above comparison example corresponding to U.S. Pat. No. 3,729,451 using maleic acid anhydride/1-octadecane-copolymerisate as the dispersion agent. The following table gives a summary of the properties of the mixtures thus obtained. It can be seen that the use of the copolymerisate according to the invention as a filler results in better elasticity values probably by virtue of its narrower particle size distribution.

Table

| | | |
|---|---|---|
| Parts by weight natural rubber | 100 | 100 |
| Parts by weight filler (maleic acid anhydride/diisobutylene-copolymerisate according to the present invention) | 45 | — |
| Parts by weight filler (maleic acid anhydride/diisobutylene copolymerisate according to US-PS 3 729 451) | — | 45 |
| Parts by weight aromatic oil (on naphthene base) | 4.5 | 4.5 |
| Parts by weight accelerator (2-benzthiazyl-N-cyclohexylsulphene amide) | 0.5 | 0.5 |
| Parts by weight sulphur | 2.5 | 2.5 |
| Vulcanisation | 30 min/ 143° C | 30 min/ 143° C |
| Elongation (%) | 610 | 800 |
| Elasticity 75° C (%) | 53 | 45 |

We claim:

1. A process for the production of a copolymer which comprises reacting maleic acid anhydride and an excess of at least one 1-olefin having from 2 to 8 carbon atoms at a temperature of from 30° C to 200° C and a pressure of from 1 to 200 atm in an organic dispersion medium comprising said 1-olefin or said 1-olefin and a solvent which is inert with respect to the monomers and which dissolves the 1-olefin but not maleic acid anhydride, the reaction taking place in the presence of a radical former and from 0.5 to 10% by weight based on the maleic acid anhydride of a dispersion agent soluble in the dispersion medium which is obtained by the reaction of:
   I. 1 mol of a copolymer of maleic acid anhydride and a 1-olefin having from 2 to 8 carbon atoms, with
   II. from 1 to 10 mol of an aliphatic, saturated or monoolefinically unsaturated, linear or branched, monohydric alcohol having from 8 to 22 carbon atoms, or from 1 to 10 mol of an aliphatic, saturated, linear or branched monoamine having from 8 to 22 carbon atoms or from 1 to 10 mol of a mixture of the monohydric alcohol and monoamine, at least 30 mol% of the anhydride groups being esterified to semi-esters or amidated to semi-amides.

2. A process as claimed in claim 1, in which the 1-olefin is ethylene, propylene, butylene, isobutylene, hexene-(1), diisobutylene, styrene, or any mixture thereof.

3. A process as claimed in claim 1, in which the monohydric alcohol is nonanol-1, 3, 5, 5-trimethylhexanol-1, decanol-1, dodecanol-1, tetradecanol-1, hexadecanol-1, octadecanol-1, oleicalcohol-1, or any mixtures thereof.

4. A process as claimed in claim 1, in which the monoamine is stearylamine-1, N-methylstearyl-amine-1 or any mixture thereof.

5. A process as claimed in claim 1, in which the 1-olefin is diisobutylene, the monohydric alcohol is dodecanol-(1) or the $C_{12}$-lorols, the dispersion agent is maleic acid-n-dodecyl-semi-ester and the dispersion medium is diisobutylene.

6. A process as claimed in claim 1, in which the copolymer has a substantially alternating and equimolecular structure.

* * * * *